United States Patent [19]
Inoue

[11] Patent Number: 5,849,237
[45] Date of Patent: Dec. 15, 1998

[54] PREPARATION OF GOLF BALLS

[75] Inventor: Michio Inoue, Chichibu, Japan

[73] Assignee: Bridgestone Sports Co., Ltd., Tokyo, Japan

[21] Appl. No.: 648,975

[22] Filed: May 17, 1996

[30] Foreign Application Priority Data

May 19, 1995 [JP] Japan ..................................... 7-145366

[51] Int. Cl.⁶ .................................................. B29C 45/03
[52] U.S. Cl. ....................... 264/319; 264/328.1; 264/335; 425/437; 425/444; 425/556
[58] Field of Search ..................................... 264/335, 334, 264/319, 328.1; 425/437, 444, 556; 249/68

[56] References Cited

U.S. PATENT DOCUMENTS

| | | | |
|---|---|---|---|
| 4,139,177 | 2/1979 | Hanning | 249/66 X |
| 4,389,365 | 6/1983 | Kudriavetz | 264/334 |
| 5,085,814 | 2/1992 | Kamiyama et al. | 264/335 |
| 5,254,304 | 10/1993 | Adachi et al. | 264/334 |
| 5,284,429 | 2/1994 | Schneider et al. | 425/130 |
| 5,342,191 | 8/1994 | Shah et al. | 425/533 |
| 5,389,227 | 2/1995 | Matyi et al. | 264/335 |
| 5,490,966 | 2/1996 | Peterson et al. | 264/335 |

*Primary Examiner*—Jan H. Silbaugh
*Assistant Examiner*—Mark Eashoo
*Attorney, Agent, or Firm*—Sughrue, Mion, Zinn, Macpeak & Seas, PLLC

[57] ABSTRACT

A golf ball is prepared by mating upper and lower mold halves (21a and 21b) to define a mold cavity (22), feeding a golf ball-molding material into the cavity to mold a golf ball, separating the upper and lower mold halves, and ejecting the molded golf ball from the lower mold half. A gas passage (2) is formed in the lower mold half in communication with the cavity. Pressurized gas is injected into the cavity (22) through the gas passage (2) to pneumatically urge the molded golf ball (23') away from the lower mold half (21b), thereby ejecting the molded golf ball from the lower mold half. The invention ensures effective ejection of a molded golf ball from the mold, producing golf balls free from flaws and deformation.

4 Claims, 5 Drawing Sheets

PREPARATION OF GOLF BALLS

BACKGROUND OF THE INVENTION

1. Field of the Invention

This invention relates to a method for preparing a golf ball. More particularly it relates to a method for preparing a golf ball which ensures effective ejection of a molded golf ball from a mold to prevent the ball from being flawed or deformed.

2. Prior Art

In general, golf balls are manufactured by injection molding or compression molding techniques. In either technique, the molded body must be taken out of the mold at the end of molding. Various attempts have been made to effectively eject the molded body from the mold. For example, one prior art method of manufacturing a two-piece golf ball by injection molding a cover over a core is described with reference to FIG. 8. A mold 21 includes an upper mold half 21a and a lower mold half 21b which are mated with each other in a separable manner to define a hollow spherical cavity 22 therebetween. A core 23 of a two-piece golf ball is placed in the cavity 22 as an insert and supported by a plurality of support pins 24 (four upper pins and four lower pins in the illustrated embodiment). A cover-forming material 25 is injected into the cavity 22. The support pins 24 are withdrawn from the cover-forming material 25 immediately before or simultaneously with the completion of injection of the cover-forming material 25. In this way, the core 23 is enclosed with a cover having a plurality of dimples. After cooling for solidification, the upper mold half 21a is detached from the other half and the lower support pins 24 which now serves as ejector pins are moved upward to separate and lift the molded golf ball from the lower mold half 21b. The molded ball is ejected in this way. Also illustrated in FIG. 8 are a degassing vent 26 and a securing pin 27 inserted and secured in the vent 26 to define a gap 28. Upon molding, air in the cavity 22 is displaced outside through the gap 28 between the vent 26 and the pin 27. The letter "P" designates a parting line between the upper and lower mold halves.

However, difficulty arises in knocking out the golf ball from the mold. A substantial force must be applied to the ejector pins in order to eject the golf ball from the mold since the cover of the golf ball sticks to the mold with a considerable bond strength. This leads to the problems of heavy wear of the ejector pin drive, difficulty of continuous molding, and a short life of the mold. Moreover, the above-mentioned method has a likelihood that the golf ball be flawed or deformed upon ejection and the ejector pins leave tracks on the ball, both adversely affecting the ball's outer appearance. Post-treatment is then required, adding to the cost.

SUMMARY OF THE INVENTION

An object of the invention is to provide a novel and improved method for preparing a golf ball which ensures effective mold release upon ejection of the golf ball from the mold, preventing the occurrence of defects and flaws on the outer appearance of the ball.

According to the invention, a golf ball is prepared by mating upper and lower mold halves in a separable manner to define a mold cavity, feeding a golf ball-molding material into the cavity to mold a golf ball, separating the upper and lower mold halves, with the molded golf ball kept received in either mold half, and ejecting the molded golf ball from the mold half. A gas passage means is provided at least in one mold half in communication with the cavity. Pressurized gas is injected into the cavity through the gas passage means to pneumatically urge the molded golf ball away from the one mold half, thereby ejecting the molded golf ball from the one mold half. The gas passage means may be a channel drilled in the mold half or constructed by fine open cells in a porous material of which at least part of the one mold half is formed.

In one preferred embodiment, ejector pins are disposed for back and forth movement in the mold half. The ejector pins are driven toward the cavity to move the molded golf ball away from the one mold half simultaneously with or after the injection of pressurized gas, thereby ejecting the molded golf ball from the one mold half.

In the method of ejecting the molded golf ball from the mold according to the invention, pressurized gas is introduced into the cavity through the gas passage to cancel the tight contact between the molded golf ball and the one mold half, enabling or at least facilitating the ejection of the molded golf ball. When the ejector pins are driven toward the cavity to eject the molded golf ball from the one mold half, the injection of pressurized gas permits the load of the ejector pins to be reduced to one third or less of the load required in the prior art. The invention ensures effective smooth ejection of the molded golf ball.

BRIEF DESCRIPTION OF THE DRAWINGS

These and further features of the present invention will be apparent with reference to the following description and drawings, wherein.

DETAILED DESCRIPTION OF THE INVENTION

Referring to FIGS. 1 to 7, various embodiments of the invention are described. In these figures, similar parts are designated by the same numerals as in FIG. 8 and their description is omitted. In FIGS. 1 to 7, only the lower mold half is depicted while the upper mold half may have the same structure as the lower mold half or that shown in FIG. 8.

Figure 1A:
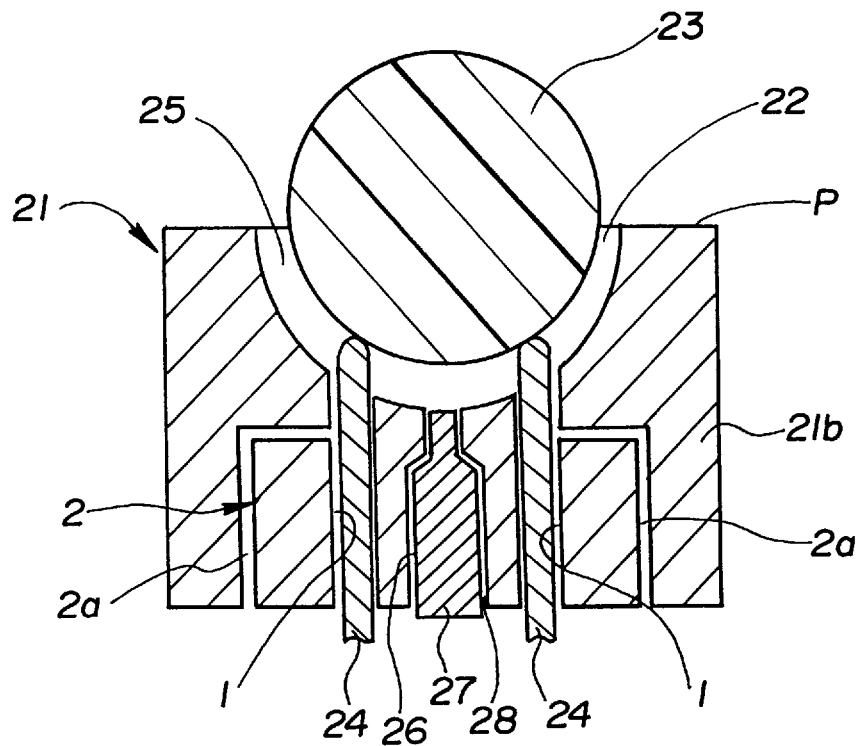
FIG. 1 is a fragmental cross-sectional view of a golf ball mold according to a first embodiment of the invention, FIG. 1A showing the mold prior to molding and FIG. 1B showing the mold at the end of molding.
Figure 1B:
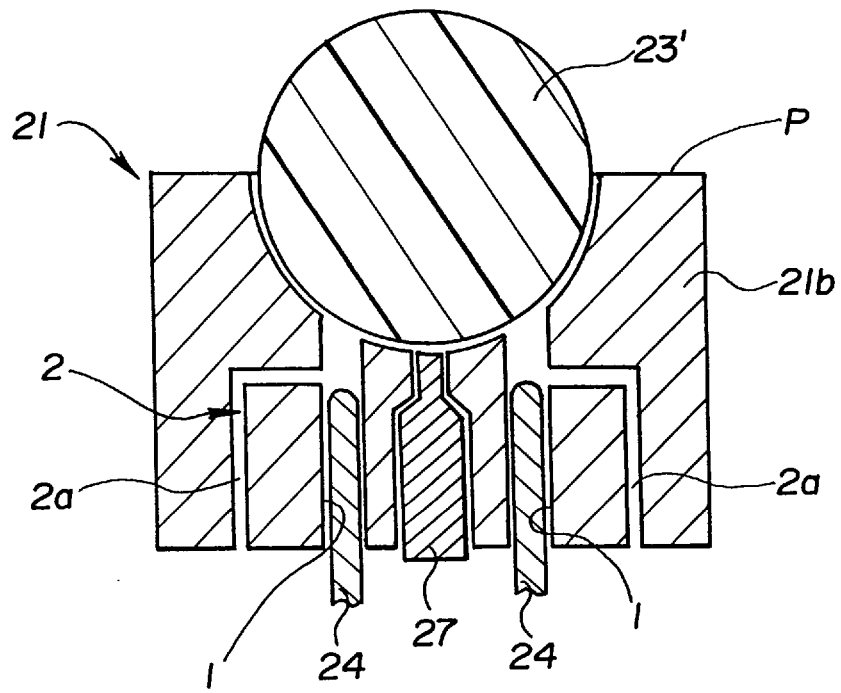

FIG. 1 illustrates a golf ball mold for carrying out the method of the invention. FIG. 1A shows the mold prior to molding and FIG. 1B shows the mold at the end of molding. A lower mold half 21b of the mold includes bores 1 in which support pins or ejector pins 24 are received for back and forth movement. The lower mold half 21b further includes channels 2a each defining a gas passage 2 having an upper end which opens to an upper portion of the bore 1 and is in fluid communication with the mold cavity 22. Each channel 2a has a lower or outer end which is connected to a pressurized gas feed means (not shown), for example, a blower. By actuating the feed means, pressurized gas is pumped into the channels 2a.

Figure 8:
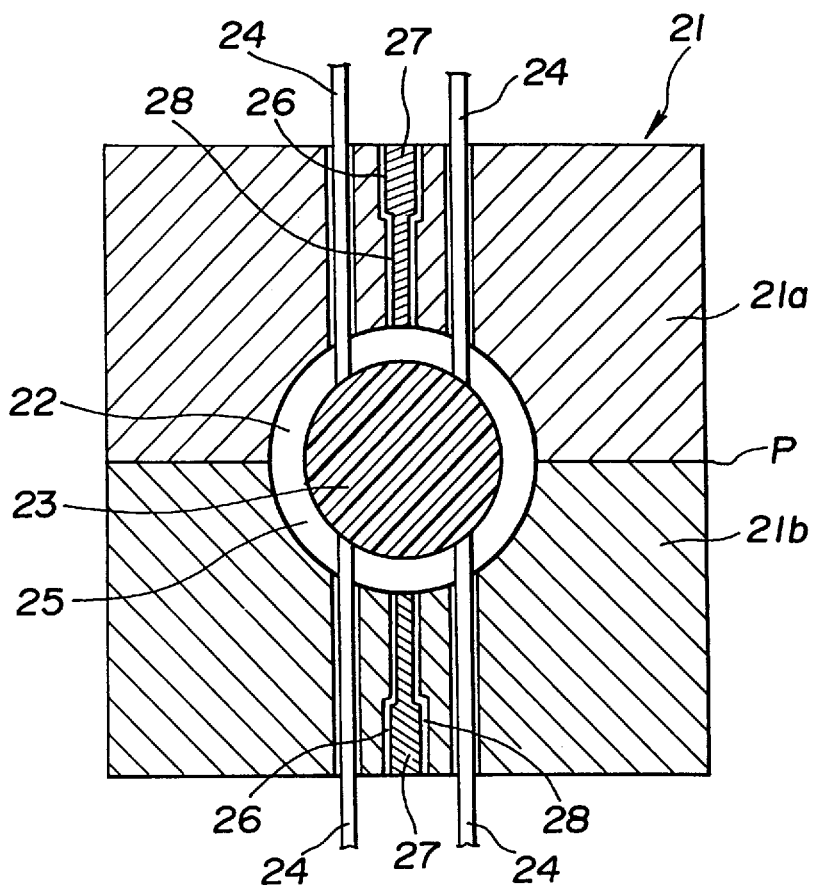
FIG. 8 is a cross-sectional view of a prior art golf ball mold.

Aside from the air ejection means, the illustrated mold can be used in the same manner as the prior art mold of FIG. 8. It is noted that the support pins 24 must be deeply retracted in the mold of FIG. 1. When the support pins 24 are retracted, the tip of the support pin 24 is located below the juncture between the bore 1 and the channel 2a as shown in FIG. 1B, permitting the channel 2a to communicate with the cavity 22 through the bore 1. At the end of molding, the upper mold half is separated from the lower mold half and the pressurized gas feed means is actuated to pump pressurized gas, typically air into the cavity 22 through the channels 2a and bore 1. The pressurized gas urges a molded golf ball 23' upward to cancel its close contact with the lower mold half 21b so that the ball 23' is pneumatically separated or rendered readily separable from the lower mold half 21b. In this state, the support pins 24 are driven toward the cavity to mechanically eject the molded golf ball 23' from the lower mold half 21. Only a reduced force is required to drive the pins 24 to eject the ball.

The pressurized gas used herein is preferably air because of ease of handling though not limited thereto. Effective ejection is accomplished by the gas under a pressure of about 4 to 15 kgf/cm$^2$.

Figure 2:
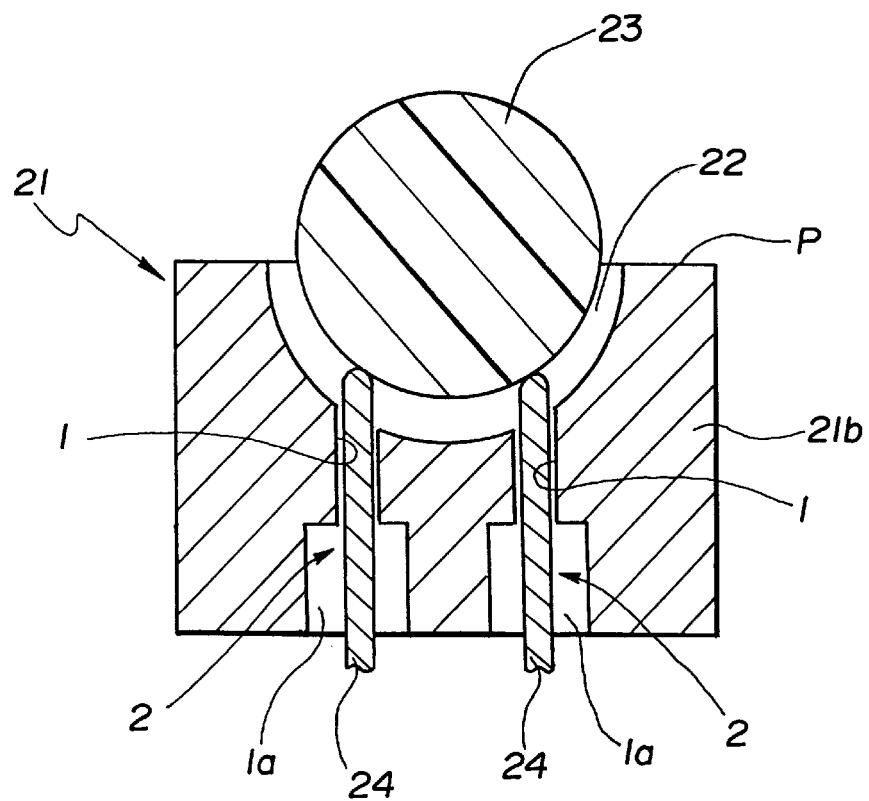
FIGS. 2 to 7 are fragmental cross-sectional views of a mold according to different embodiments of the invention.

FIG. 2 illustrates another example of a mold for carrying out the method of the invention. In this embodiment, the pin insertion bore 1 has a lower portion 1a which is dilated so as to serve as a gas passage 2. When the support pins 24 are retracted, the tip of the support pin 24 is located within the dilated lower portion 1a, permitting pressurized gas to be introduced into the cavity 22 from the dilated lower portion 1a.

Figure 3:
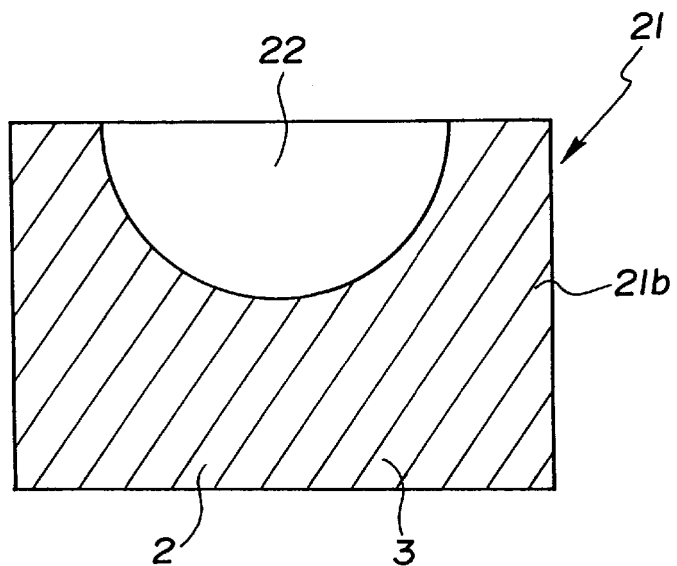
Figure 4:
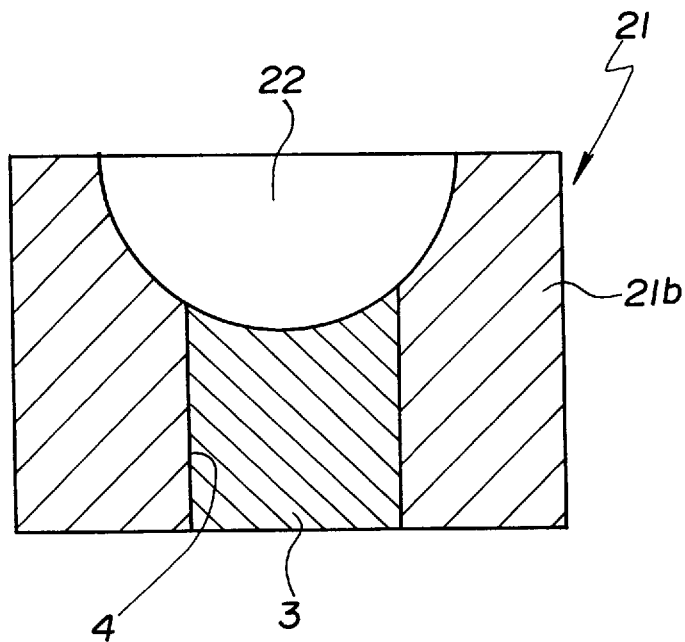
Figure 5:
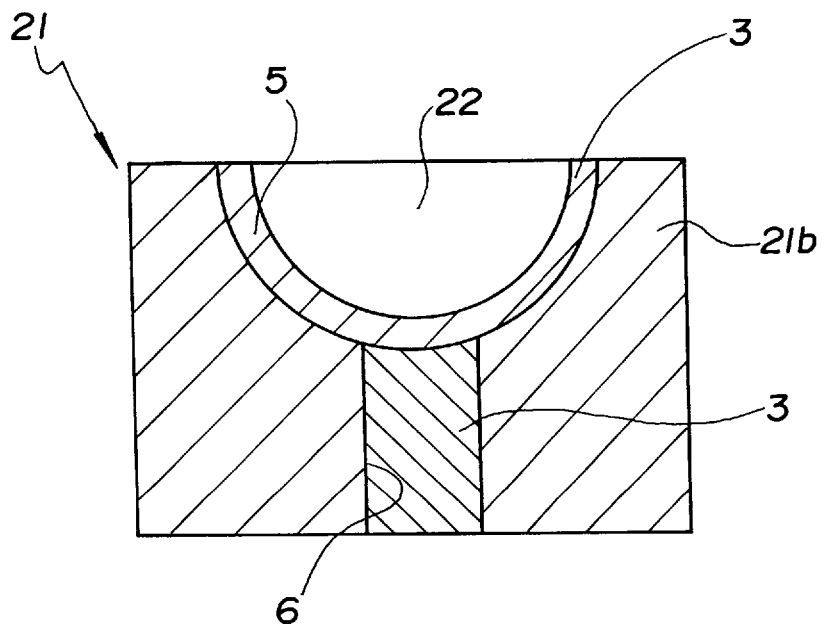

FIGS. 3 to 5 illustrate third to fifth embodiments of the invention. In these embodiments, the lower mold half 21b is partially or entirely formed of a porous material. The porous material has fine open cells which serve as a gas passage. With the pressurized gas feed means connected to the porous material, pressurized gas can be channeled to the cavity through the open cells in the porous material. More particularly, in FIG. 3, the entirety of the lower mold half 21b is formed of a porous material 3. In FIG. 4, the lower mold half 21b is formed with a large diameter bore 4 opening to the cavity 22 and the bore 4 is filled with a porous material 3. In FIG. 5, a surface layer 5 of a porous material 3 is formed on the cavity surface and the lower mold half 21b is perforated with a bore 6 reaching the surface layer 5. The bore 6 is filled with a porous material 3, if desired.

The porous material used herein may be selected from sintered bodies which are prepared by firing metal powder such as nickel-base alloys (e.g., Ni—Co alloys) or ceramic powder so as to create fine open cells in a three-dimensional network, sprayed materials obtained by thermally spraying such metal powder or ceramic powder, metal foams, and ceramic foams. Where the porous material is exposed at the cavity surface as in FIGS. 3 to 5, the porous material should preferably have a cell size of up to 100 $\mu$m, more preferably up to 20 $\mu$m, most preferably 5 to 15 $\mu$m. A larger cell size outside the range would cause burring.

Where the porous material 3 entirely extends over the cavity surface as in FIGS. 3 and 5, pressurized gas is injected toward the molded ball 23' from the entire cavity surface so that the tight contact of the ball 23' with the lower mold half 21b is canceled over its entirety, leading to more effective ejection. The embodiment of FIG. 4 is also advantageous for ejection since pressurized gas can be supplied to the molded golf ball 23' over a wide area.

Though not shown in FIGS. 3 to 5, support or ejector pins are provided in the lower mold half as in FIGS. 1 and 2. The support or ejector pins themselves may be formed of a porous material. If the support or ejector pins 24 are formed of a porous material in the embodiments of FIGS. 1 and 2, pressurized gas can be channeled through fine open cells in the porous material for achieving or assisting ejection. In this case, formation of channels as in FIG. 1 can be omitted if desired. That is, ejection can be achieved solely by channeling pressurized gas to the cavity through fine open cells in the support or ejector pins.

Figure 6:
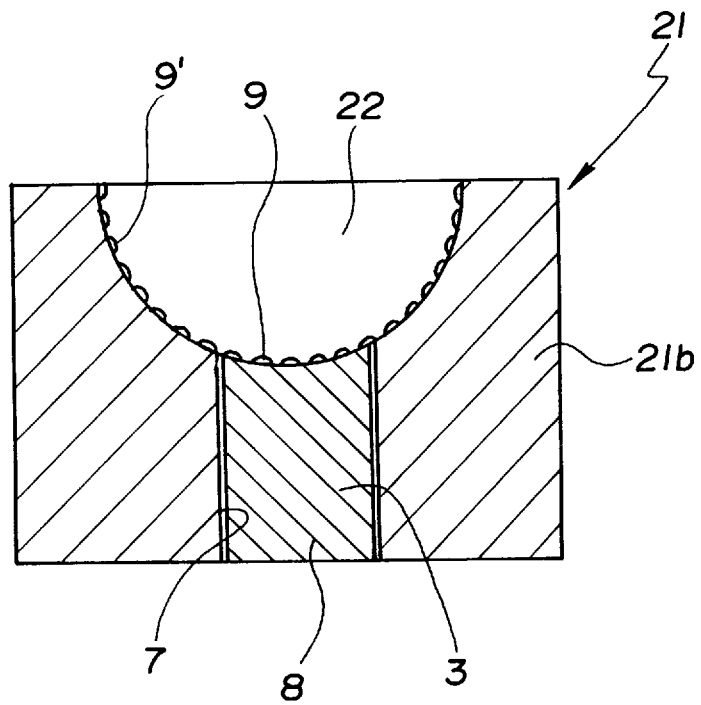

FIG. 6 shows a sixth embodiment of the invention wherein the ejector pin is formed of a porous material. The lower mold half 21b is formed with a large diameter bore 7 opening to the cavity 22. A large diameter ejector pin 8 made of a porous material 3 is received in the bore 7 for back and forth movement. The pin 8 has a generally spherical top surface which defines the cavity together with the inner wall surface of the mold half. The pin top surface is formed with projections 9 corresponding to dimples (between lands) of a golf ball. The remaining mold cavity surface is also formed with projections 9' corresponding to dimples of a golf ball. When a molding material is fed into the cavity, the pin 8 is located such that its top surface is conformal with the remaining cavity surface of the lower mold half whereby dimples are formed at the same time as the ball is molded. At the end of molding, the molded golf ball is ejected by channeling pressurized gas toward the cavity through open cells in the pin 8 while moving the pin 8 forward. In this embodiment, the pin 8 can be formed to a large diameter. The large diameter pin 8 does not adversely affect the outer appearance and performance of a molded golf ball because its top surface forms a part of the cavity surface.

Figure 7:
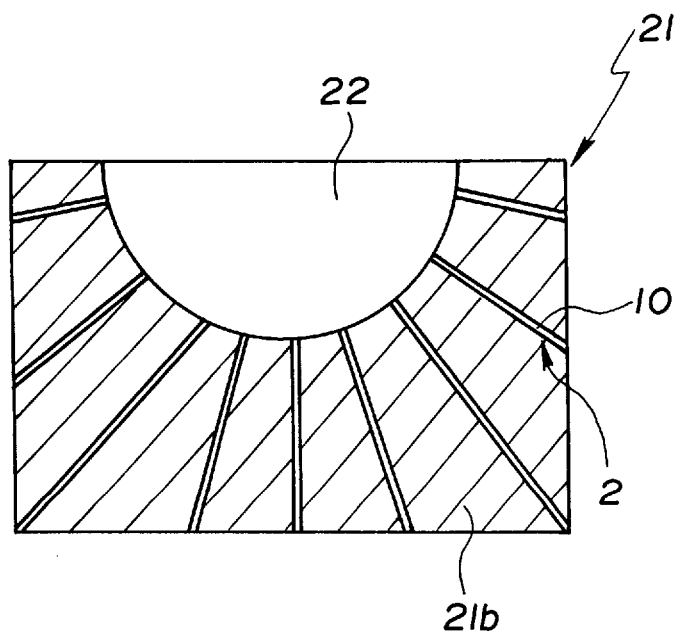

FIG. 7 shows a mold according to a seventh embodiment of the invention. The lower mold half 21b is formed with a plurality of slits 10 extending radially with respect to the cavity 22. The slits 10 serve as gas passages 2 for channeling pressurized gas to the cavity 22 therethrough for achieving ejection of a molded golf ball.

As mentioned above, since pressurized gas is introduced toward the cavity through the gas passage means to pneumatically urge a molded golf ball, the close contact of the molded golf ball with the lower mold half is effectively canceled. Then the molded golf ball can be readily ejected from the lower mold half by applying an appropriate force to the ejector pins or even without using the ejector pins. Differently stated, the molded golf ball can be removed by pneumatic ejection alone or in cooperation with mechanical ejection.

According to the invention, the force to be applied to the ejector pins can be significantly reduced as compared with the prior art. A molded golf ball can be ejected with a reduced force. In a test for confirming the advantages of the invention, a pressure gage was used to measure the pressure force to be applied to the ejector pins to eject a molded golf ball. As a result, the pressure force to be applied to the ejector pins could be reduced to about ⅓ of the pressure force required when the ball was ejected solely by the pins without pneumatic ejection. This minimizes outer appearance defects such as flaws and deformation which can otherwise occur on the golf ball upon ejection. Post-treatment for such defects is eliminated. The time of a molding cycle is thus reduced. These advantages enable automatic continuous molding and hence, mass scale production. Since the ejector pin drive mechanism is not worn, the mold is increased in effective life. As compared with the prior art, high quality golf balls free of deformation and flaws can be manufactured at low cost.

The present invention is not limited to the illustrated embodiments and modifications may be made within the scope of the invention. For example, pressurized gas can be channeled through a gap between the support pin 24 and the bore 1 in FIG. 1 or the gap 28 in FIG. 8. Any other appropriate gas passage may be formed in the lower mold half for injecting pressurized gas into the cavity. Ejector pins and support pins may be separately provided instead of the support pins also serving as ejector pins. A gas passage for ejection is formed in the lower mold half in the illustrated embodiments because the molded golf ball is typically left in the lower mold half when the upper and lower mold halves are separated at the end of molding. In a certain mold structure, the ball is caught by the upper mold half and separated from the lower mold half. In this case, the upper mold half is provided with a gas passage for ejection. Where the ball is not always caught by either of the upper and lower mold halves, it is recommended that each of the upper and lower mold halves is provided with a gas passage for ejection.

As long as molds are used, the present invention is applicable to the preparation of various golf balls including the core and cover of multiple solid golf balls such as one- and two-piece golf balls, and the solid center and cover of wound golf balls. The molding technique may be either injection molding or compression molding.

The present invention ensures effective smooth ejection of a molded golf ball from a mold. There are produced high-quality golf balls free from defective outer appearance such as flaws and deformation.

I claim:

1. A method for preparing a golf ball using a mold comprising separable upper and lower mold halves which define a cavity when mated, said upper and lower mold halves having a plurality of bores in which support pins are received for back and forth movement into and out of the cavity, each of the bores communicating with the cavity, and said lower mold half including channels each defining a passage having an upper end which opens to an upper portion of the bores and a lower end which is connected to a source of pressurized gas, said method comprising the steps of:

feeding a golf ball-molding material into the cavity and molding the golf ball, separating the upper and lower mold halves with the golf ball remaining in said lower mold half, and ejecting the golf ball from said lower mold half, said ejecting comprising; retracting the support pins of said lower mold half so that tips of the support pins are located below a juncture between the bores and the channels, thereby permitting the channels to communicate with the cavity through the bores, actuating the source of pressurized gas to feed pressurized gas into the cavity through the channels and the bores, and then moving the support pins toward the cavity to mechanically eject the golf ball from the lower mold half, the pressurized gas facilitating the ejecting of the golf ball.

2. The method of claim 1 wherein said pressurized gas is supplied from said source at a pressure in the range of 4 to 15 $kgf/cm^2$.

3. A method for preparing a golf ball using a mold comprising separable upper and lower mold halves which define a cavity when mated, said upper and lower mold halves having a plurality of bores in which support pins are received for back and forth movement into and out of the cavity, each of the bores communicating with the cavity, and each of the bores of said lower mold half having a dilated lower portion which serves as a gas passage and being connected to a source of pressurized gas, said method comprising the steps of;

feeding a golf ball-molding material into the cavity and molding golf ball, separating the upper and lower mold halves with the golf ball remaining in said lower mold half, and ejecting the golf ball from said lower mold half, said ejecting comprising; retracting the support pins of said lower mold half so that tips of the support pins are located within the dilated lower portion thereby permitting the dilated lower portion to communicate with the cavity, actuating the source of pressurized gas to feed pressurized gas into the cavity from the dilated lower portion, and then moving the support pins toward the cavity to mechanically eject the golf ball from the lower mold half, the pressurized gas facilitating the ejecting of the golf ball.

4. The method of claim 3 wherein said pressurized gas is supplied from said source at a pressure in the range of 4 to 15 $kgf/cm^2$.

* * * * *